United States Patent [19]

Sakoe

[11] Patent Number: 4,555,796
[45] Date of Patent: Nov. 26, 1985

[54] DP MATCHING SYSTEM FOR RECOGNIZING A STRING OF WORDS CONNECTED ACCORDING TO A REGULAR GRAMMAR

[75] Inventor: Hiroaki Sakoe, Tokyo, Japan

[73] Assignee: Nippon Electric Co., Ltd., Tokyo, Japan

[21] Appl. No.: 448,088

[22] Filed: Dec. 9, 1982

[30] Foreign Application Priority Data

Dec. 10, 1981 [JP] Japan .............................. 56-199098

[51] Int. Cl.$^4$ .............................................. G10L 1/00
[52] U.S. Cl. ........................................ 381/43; 364/300
[58] Field of Search .................................. 381/41–43; 364/300

[56] References Cited

U.S. PATENT DOCUMENTS 4,277,644 7/1981 Levinson et al. ...................... 381/43
4,400,788 8/1983 Myers et al. ........................... 381/43

Primary Examiner—E. S. Matt Kemeny
Attorney, Agent, or Firm—Sughrue, Mion, Zinn, Macpeak & Seas

[57] ABSTRACT

A connected word recognition system operable according to a DP algorithm and in compliance with a regular grammar, is put into operation in synchronism with successive specification of feature vectors of an input pattern. In an m-th period in which an m-th feature vector is specified, similarity measures are calculated (58, 59) between reference patterns representative of reference words and those fragmentary patterns of the input pattern, which start at several previous periods and end at the m-th period, for start and end states of the reference words. In the m-th period, an extremum of the similarity measures is found (66, 69, 86), together with a particular word and a particular pair of start and end states thereof, and stored (61–63). Moreover, a particular start period is selected (67, 86) and stored (64). A previous extremum found and stored (61) during the (m−1)-th period for the particular start state found in the (m−1)-th period, is used in the m-th period as a boundary condition in calculating each similarity measure. After all input pattern feature vectors are processed, a result of recognition is obtained (89) by referring to the stored extrema, particular words, particular start states, and particular start periods.

1 Claim, 15 Drawing Figures

FIG. I
PRIOR ART
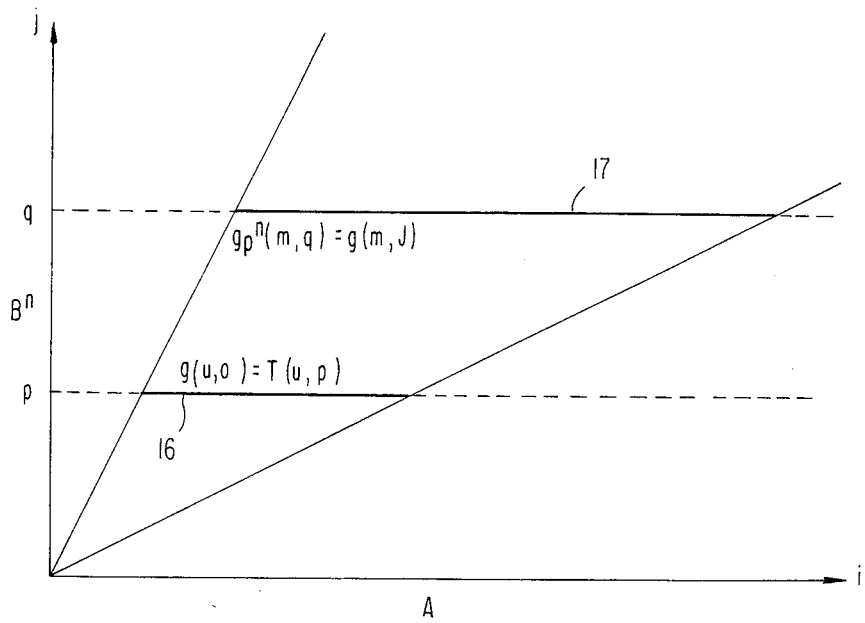
$gp^n(m,q) = g(m,J)$
$g(u,0) = T(u,p)$
FIG. 2
PRIOR ART
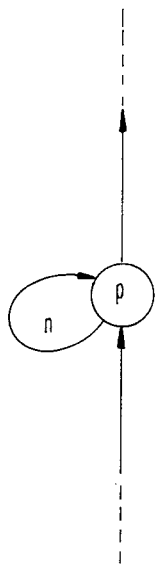
FIG. 3
PRIOR ART
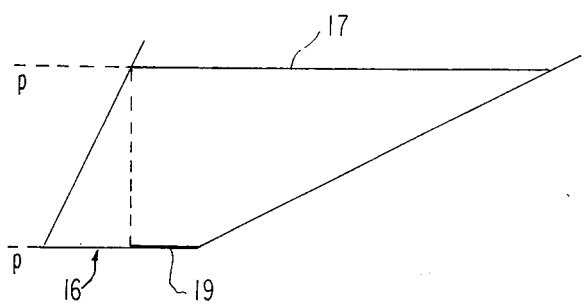

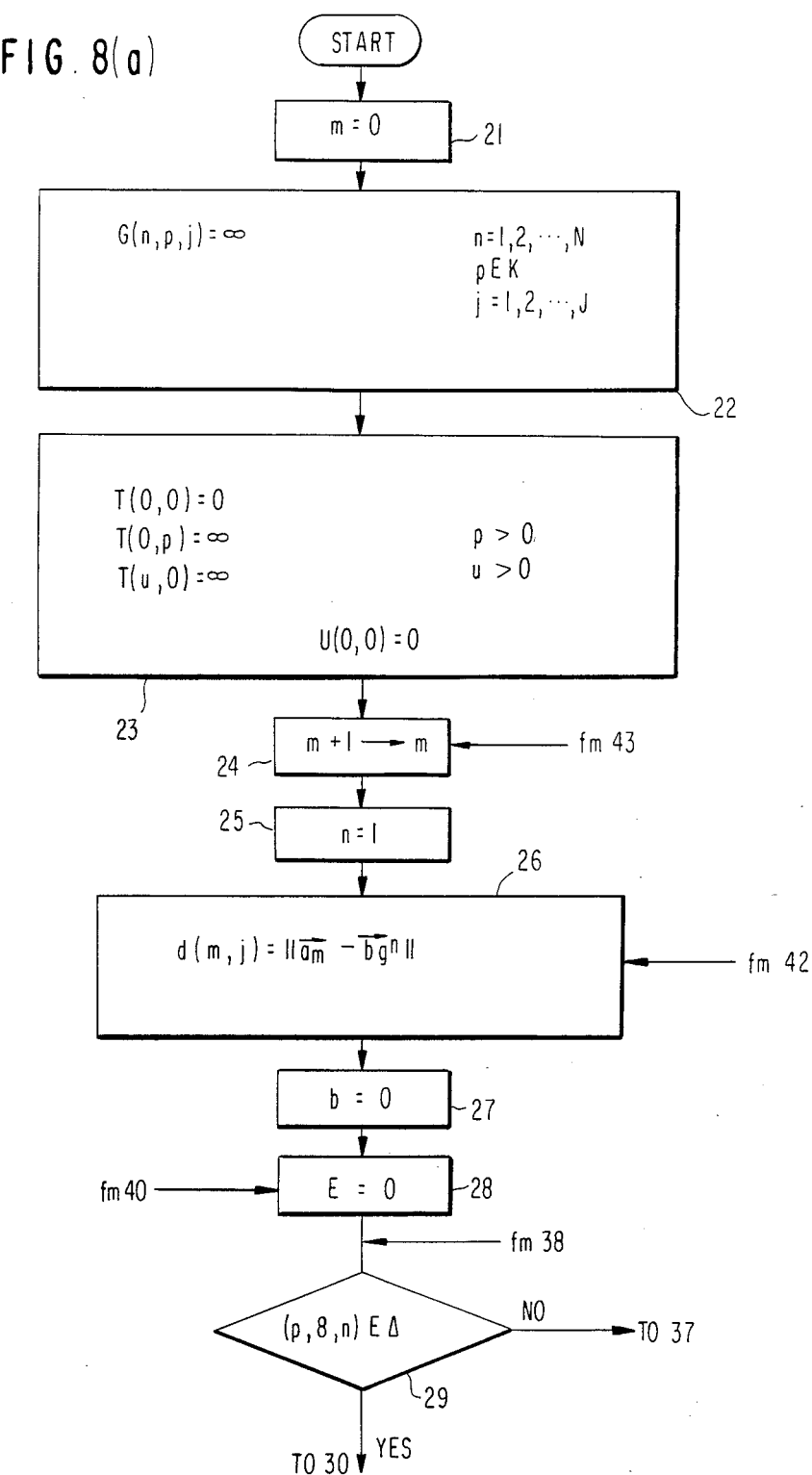

DP MATCHING SYSTEM FOR RECOGNIZING A STRING OF WORDS CONNECTED ACCORDING TO A REGULAR GRAMMAR

BACKGROUND OF THE INVENTION

This invention relates to a system for recognizing an input string of words which are substantially continuously uttered in compliance with a regular grammar. The system according to this invention is operable by resorting to a dynamic programming technique.

A connected word recognition system has a wide field of application and is in practical use in recognizing continuously uttered or spoken words. The continuously uttered words may, for example, be computer programs, sentences in business documents, and directions for airplane or ship control. It is already known to restrict an input string or chain of such words by a regular grammar or syntax in order to raise the accuracy of recognition. Implementation of the syntactical restriction as a connected word recognition system of high performance is, however, not so easy as will presently become clear.

According to U.S. Pat. No. 4,326,101 issued to Hiroaki Sakoe, the present applicant and assignor to the present assignee, an input string or chain of words selected from a word set and substantially continuously uttered in compliance with a regular grammar, is supplied to a connected word recognition system as an input pattern A. On selecting the words, repetition is allowed according to the grammar. When the input pattern A has an input pattern length or duration I in terms of frame periods, the pattern A is represented by an input sequence of first through I-th input pattern feature vectors $a_1$ to $a_I$ which are time sequentially arranged in first through I-th frame periods, respectively, as:

$$A = a_1, a_2, \ldots, a_I.$$

Merely for simplicity of denotation, the vectors will be denoted in the following by usual letters, as a by a.

The word set is preliminarily selected so as to cover various input strings. The word set consists of a plurality of words, which are called reference words. It is possible to identify or designate the reference words by consecutive natural numbers. It will be assumed that the word set consists of first through N-th reference words 1 to N. An optional reference word will be referred to as an n-th reference word n.

The first through the N-th reference words 1 to N are memorized in a reference pattern memory as first through N-th reference patterns $B^1$ to $B^N$. An n-th reference pattern $B^n$ representative of the n-th reference word n, is given by first through J-th reference pattern feature vectors $b_1^n$ to $b_J^n$ as:

$$B^n = b_1^n, b_2^n, \ldots, b_J^n.$$

Depending on the circumstances, the affix "n" will be omitted. It will be presumed that the first through the N-th reference patterns B's have a common reference pattern length J merely for brevity of description and that the first through the J-th reference pattern feature vectors $b_1$ to $b_J$ are successively arranged according to utterance of the n-th reference word n, namely, so as to represent the variation of the n-th reference pattern B with time.

The input string is correctly recognized, by using a finite-state automaton, as an optimum one of word concatenations, each of which is a string of words selected from the word set and concatenated in compliance with the grammar. A result of recognition is given by the optimum concatenation. In the following, a finite-state automaton will be referred to merely as an automaton.

In an article contributed in Japanese by Hiroaki Sakoe to a technical report published July 1980 by the Institute of Electronics and Communication Engineers of Japan, an automaton $\alpha$ is defined by:

$$\alpha = <K, \Sigma, \Delta, p_0, F>,$$

in which K represents a set of states p's. Like the reference words, the states p's will be identified by consecutive natural numbers, such as from 1 up to . In this event, the state set K is more specifically represented by $\{p | p = 1, 2, \ldots, \}$. $\Sigma$ represents a word set $\{n | n = 1, 2, \ldots, N\}$ of reference words 1 through N of the type described above. $\Delta$ represents a state transition table $\{(p, q, n)\}$, where a combination (p, q, n) represents a transition rule or state transition from a state p to a state q which is in the state set. Furthermore, $P_0$ represents an initial state and F, a set of final states at which the word concatenations can end.

The state p at which the n-th reference word n starts, is called a start state. The state q at which the n-th reference word n ends, is named an end state. The start and the end states of such a state pair may or may not be different from each other and need not be consecutively numbered among the natural numbers 1 through . An end state of a reference word is usually a start state of another reference word unless the end state in question is an element of the final state set F. The initial state is a start state of at least one predetermined reference word and will be denoted by 0 (zero).

Reverting to the above-specified Sakoe patent, a fragmentary or partial pattern A(u, m) of the input pattern A is defined by:

$$A(u, m) = a_{u+1}, a_{u+2}, \ldots, a_m,$$

where u and m are called a start and an end point or period and are selected so that $0 \leq u < m \leq I$. If used in connection with the whole input pattern A, the start and the end points are an initial point or period 0 and a final point or period I.

A local distance $D(A(u, m), B^n)$ between the fragmentary pattern A(u, m) and the n-th reference pattern $B^n$ will be denoted by D(u, m, n). Attention will be directed to a group of fragmentary patterns A(u, m)'s which have a common end point m. For convenience of the following description, the natural number for each input pattern feature vector will be denoted by i and called a first natural number. The natural number for each reference pattern feature vector will be designated by j and named a second natural number. The distance is used as a similarity measure.

It is possible to calculate a group of local distances D(u, m, n)'s between each reference pattern B and the fragmentary pattern group A(u, m)'s by resorting to a dynamic programming technique. The expression "dynamic programming" is ordinarily abbreviated to DP. The local distance group D(u, m, n)'s is obtained by iteratively calculating a distance recurrence formula, which may be:

$$g(i,j) = d(i,j) + \min \begin{bmatrix} g(i+1,j) \\ g(i+1, j+1) \\ g(i+1, j+2) \end{bmatrix}. \quad (1)$$

where g(i, j) is herein named a new recurrence value; g(i+1, j), g(i+1, j+1), and g(i+1, j+2) are called previous recurrence values, respectively; and d(i, j) represents an elementary distance $\|a_{i-bj}\|$ between an i-th input pattern feature vector $a_i$ and a j-th reference pattern feature vector $b_j$.

Formula (1) is calculated, starting at an initial condition:

$$g(m, J) = d(m, J),$$

with the second natural number j successively varied from J down to 1 and by using the first natural numbers i's in an adjustment window:

$$j+m-J-r \leq i \leq j+m-J+r,$$

where r represents a predetermined positive integer called a window width or length in the art. The local distance group is given by:

$$D(u, m, n) = g(u+1, 1),$$

for the start points u's in:

$$m-J-r \leq u \leq m-J+r. \quad (2)$$

Calculation of Formula (1) is repeated for the respective reference patterns B's. Groups of local distances thereby obtained will be again denoted by D(u, m, n)'s.

By resorting to a DP technique once more, an extremum recurrence formula is introduced as:

$$T(m, q) = \min [T(u, p) + D(u, m, n)], n, p, u \quad (3)$$

where (p, q, n)∈Δ. In Formula (3), T(m, q) and T(u, p) will be named a new and a previous extremum. An initial condition:

$$T(0, 0) = 0,$$

is set for Formula (2) in a first table memory, in which new extrema are successively stored for use, for the time being, as previous extrema. It is possible to calculate Formula (2) while local distances are calculated between each fragmentary pattern A(u, m) and the respective reference patterns B's.

Concurrently, the following substitution process is carried out:

$$\left.\begin{array}{l} N(m, q) = \tilde{n}. \\ P(m, q) = \tilde{p}. \\ U(m, q) = \tilde{u}. \end{array}\right\} \quad (4)$$

where n, p, and u represent those particulor ones of the reference words n's, start states p's, and start points u's which give a new extremum. The particular word, start state, and start point are stored in second through fourth table memories, respectively.

Formulae (3) and (4) are calculated with the end point m varied from 1 up to I, when a final extremum T(I, q) is stored in the first table memory. Final values N(I, q), P(I, q), and U(I, q) are stored in the second through the fourth table memories. The result of recognition is obtained as will later be described.

It is possible to understand that the natural numbers i and j represent instants along first and second time axes i and j. A pair of instants (i, j) represents a grid or lattice point on an i-j plane.

It is to be noted that a considerable amount of calculation is necessary for Formula (1) and consequently for Formulae (3) and (4). This is because Formula (1) must be calculated for each end point m and for each reference pattern B by referring to a number of grid points even though the adjustment window is used. Incidentally, the process defined by Formulae (1) and (3) is to determine a new extremum T(m, q) at each instant m and for each end state q from first and second term enclosed with a pair of brackets on the right-hand side of Formula (3). The second term represents groups of local distances D(u, m, n)'s between every one of the reference patterns B's and a group of fragmentary patterns A(u, m)'s which have a common end point at the m-th instant m and a plurality of start points at previous instants u's related to that instant m according to Formula (2). The first term represents a plurality of previous extrema T(u, p)'s decided at the previous instants u's for a plurality of start states p's which are related to that end state q and the reference patterns B's by (p, q, n) ∈Δ.

On the other hand, an article is contributed by Cory S. Myer et al to IEEE Transactions on Acoustics, Speech, and Signal Processing, Volume ASSP-29, No. 2 (April 1981), pages 284–297, under the title of "A Level Building Dynamic Time Warping Algorithm." Briefly speaking, the algorithm is for effectively carrying out the process defined hereinabove by Formulae (1) and (3).

For this purpose, a distance recurrence formula is iteratively calculated for each start state p of each reference word n. The recurrence formula may be:

$$g(i,j) = d(i,j) + \min \begin{bmatrix} g(i-1,j) \\ g(i-1, j-1) \\ g(i-1, j-2) \end{bmatrix}. \quad (5)$$

As will later be described with reference to one of twelve figures of the accompanying drawing, Formula (5) is calculated under a boundary condition:

$$g(u, 0) = T(u, p),$$

for the start state p under consideration. The start points u's are selected by provisionally assuming a range of the first natural numbers i's. The second natural number j is successively varied from 1 up to J. Until the second natural number j reaches a final point J of the reference word n in question, the first natural number i is varied from the start points u's towards those end points m's of the fragmentary patterns A(u, m)'s which will be called ultimate points.

Each time when a new recurrence value g(i, j) is calculated, the following substitution process is carried out under another initial condition:

$$h(u, 0) = u,$$

for a pointer or path value h(i, j):

$$\left.\begin{array}{l}h(i,j) = h(i-1,j), \\ h(i,j) = h(i-1,j-1), \\ \text{and } h(i,j) = h(i-1,j-2),\end{array}\right\} \quad (6)$$

if previous recurrence values $g(i-1, j)$, $g(i-1, j-1)$, and $g(i-1, j-2)$ minimize the second term on the right-hand side of Equation (5), respectively. The meaning of the pointer $h(i, j)$ will later become clear.

When Formulae (5) and (6) are calculated up to the final point J, ultimate recurrence values $g(m, J)$ and ultimate pointers $h(m, J)$ are obtained. Inasmuch as each ultimate value $g(m, J)$ or $h(m, J)$ is obtained for a start state p and a reference word n having that start state p and inasmuch as the J-th reference pattern feature vector $b_J$ corresponds to the end state q defined by a combination (p, q, n), it is possible to denote the values $g(m, J)$ and $h(m, J)$ by $g_p^n(m, q)$ and $h_p^n(m, q)$ depending on the circumstances. It is to be noted here that both p and q should be understood to represent natural numbers assigned, as p-th and q-th states in the state set K, to the start and the end states p and q of a state pair (p, q) of the n-th reference word n.

Such ultimate recurrence values $g_p^n(m, q)$ and ultimate pointers $h_p^n(m, q)$ are calculated for the respective reference words n's and for the start states p's which satisfy $(p, q, n) \in \Delta$. Thereafter, an extremum:

$$T(m, q) = \min [g_p^n(m, q)], n, p \quad (7)$$

is calculated. At the same time, values $N(m, q)$, $P(m, q)$, and $U(m, q)$ are decided according to:

$$\left.\begin{array}{l}N(m, q) = \tilde{n}, \\ P(m, q) = \tilde{p}, \\ \text{and } U(m, q) = h_{\tilde{p}}^{\tilde{n}}(m, q),\end{array}\right\} \quad (8)$$

where n and p represent the particular reference word and start state of the type described heretobefore. The pointer $h_p^n(m, q)$ for the particular reference word n and the particular start state p will be called a particular pointer and be briefly denoted by n.

The algorithm satisfactorily reduces the amount of calculation. It is, however, impossible to prosecute the algorithm when the transition table $\Delta$ of the automaton $\alpha$ includes a loop as will later be described. This is a serious defect of the Myer et al algorithm. In contrast, the connected word recognition system revealed in the above-referenced Sakoe patent is capable of dealing with loops.

SUMMARY OF THE INVENTION

It is therefore an object of the present invention to provide a system for recognizing an input string of words uttered in compliance with a regular grammar, which system is capable of providing a result of recognition with a less amount of calculation as compared with the teaching of the above-cited Sakoe patent.

It is another object of this invention to provide a connected word recognition system of the type described, which is operable like the above-mentioned teaching even when a loop is included in a state transition table specifying the regular grammar.

It is a further object of this invention to provide an economic system of the type described and of high performance.

According to this invention, there is provided a system responsive to an input sequence of input pattern feature vectors representative of an input string of words selected from a word set of first through N-th words and substantially continuously uttered in compliance with a regular grammar for recognizing the input string as an optimum one of word concatenations, each of which is a string of words selected from the word set and concatenated in compliance with the grammar. The grammar specifies a set of transition rules for the first through the N-th words and a set of final states of the concatenations. The transition rule for an n-th word optionally selected from the word set, defines a combination of the n-th word and a state pair consisting of a start and an end state of the n-th word. The system comprises a reference pattern memory, control means, similarity calculating means, extremum finding means, start period selecting means, and deciding means.

The reference pattern memory is for memoriding reference pattern feature vectors representative of the first through the N-th words. The reference pattern feature vectors representative of the n-th word are consecutively numbered as first through J-th feature vectors according to utterance of the n-th word.

The control means is for generating a basic timing signal successively specifying first through I-th periods assigned to the respective input pattern feature vectors, a word specifying signal specifying, while an m-th period is specified as each of the first through the I-th periods, the first through the N-th words, and a state specifying signal specifying, while the m-th period is specified, the state pairs for the first through the N-th words.

The similarty calculating means is responsive to the input sequence and is coupled to the reference pattern memory and the control means for calculating, while the n-th word is specified in the m-th period, a plurality of similarity measures between the input pattern feature vector assigned to the m-th period and the first through the J-th feature vectors.

The extremum finding means is coupled to the control means and the similarity calculating means for calculating, while the n-th word and each state pair for the n-th word are specified in the m-th period, a recurrence value $g_p^n(m, q)$ for the n-th word and the above-mentioned each state pair under a boundary condition iteratively in correspondence to the first through the J-th feature vectors by using the similarity measures calculated for the n-th word before the m-th period, where m represents the m-th period, n represents the n-th word, and p and q represent the start and the end states of the above-mentioned each state pair. The extremum finding means is furthermore for finding, while the m-th period is specified, an extremum $T(m, q)$ of the recurrence values calculated for the words having state pairs including the end state q and for deciding that particular word and that particular start state of the particular word for which the extremum is found. The boundary condition is given by $T(m-1, p)$.

The start period selecting means is coupled to the control means and the extremum finding means for selecting, while the m-th period is specified, a particular period from the first through the $(m-1)$-th periods with reference to the particular start state and the particular word.

The deciding means is coupled to the control means, the extremum finding means, and the start period selecting means for deciding the optimum concatenation by referring, after lapse of the I-th period, to the extrema found in the first through the I-th periods, respectively, and to those particular words, those particular start states, and those particular start periods which are decided in the first through the I-th periods.

BRIEF DESCRIPTION OF THE DRAWING

FIG. 1 is a schematic diagram for use in describing a prior art algorithm;

FIG. 2 shows a loop in a state transition table;

FIG. 3 is another schematic diagram for use in describing the prior art algorithm;

DESCRIPTION OF THE PREFERRED EMBODIMENTS

Figure 4:
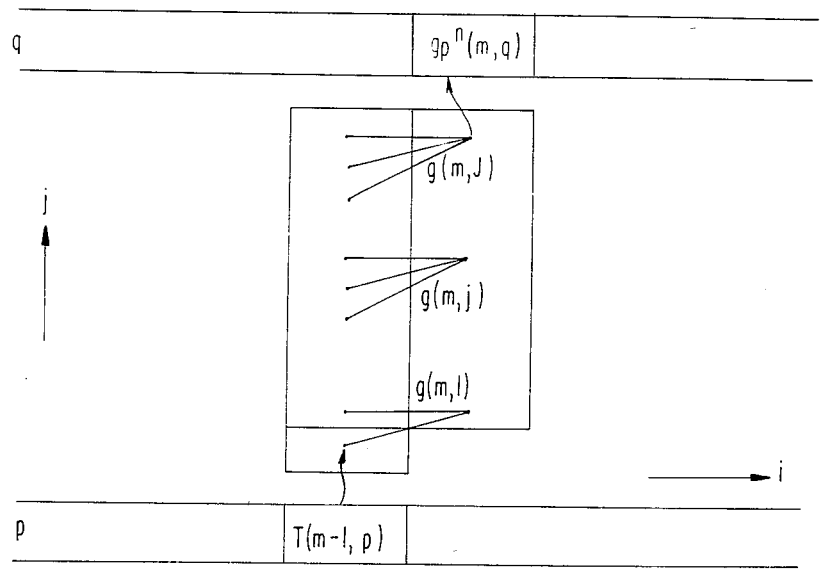
FIG. 4 is a schematic diagram for use in describing operation of a connected word recognition system according to the instant invention.

Referring to FIG. 1, the algorithm outlined hereinabove in connection with the above-referenced Myer et al article, will be reviewed at first in order to facilitate an understanding of the present invention. The figure being referred to, is a substantially reproduction of FIG. 3 of the Myer et al article and is similar to FIG. 10 of U.S. Pat. No. 3,816,722 issued to Hiroaki Sakoe et al and assigned to the present assignee. Nomenclature and notations are, however, adapted to the description in the instant specification. The first and the second time axes i and j are depicted as orthogonal coordinate axes and with an initial point $j=0$ for an n-th reference pattern $B^n$ shifted along the second time axis j to a point indicated by a start state p of the n-th reference word n represented by the n-th reference pattern $B^n$. The start state p is a state at which previous extrema T(u, p) for use in Formula (7) are already calculated for a previous reference pattern (not shown) representative of a next previous reference word in a word concatenation. The previous reference word has an end state at the state p and ultimate points of those fragmentary patterns of an input pattern A at points u's in a predetermined range indicated by a first line 16, which are matched to the previous reference pattern.

The boundary conditions $g(u, 0) = T(u, p)$ for Formula (7) are given for the start state p of the n-th reference word n and a plurality of start points U's of fragmentary patterns A(u, m)'s which are to be matched to the n-th reference pattern $B^n$. The start points u's are present on the first line 16. For use as the boundary conditions, the previous extrema T(u, p) are already memorized in the first table memory of the type described above. Other previous values N(u, p), P(u, p), and U(u, p) are memorized in the second through the fourth table memories, respectively.

The ultimate recurrence values $g_p{}^n(m, q)$ are calculated for an end state q of the n-th reference word n in a preselected range indicated by a second line 17 by iteratively calculating Formula (7) in an area between the lines 16 and 17. The preselected range represents ultimate points m's of the fragmentary patterns A(u, m)'s matched to the reference pattern $B^n$ in question. The ultimate pointers $h_p{}^n(m, q)$ are decided for the end state q and for the reference pattern $B^n$ according to Formulae (8).

Alter such ultimate recurrence values and ultimate pointers are calculated for the end state q, for the respective reference patterns B's, and for all start states p's defined by (p, q, n)∈Δ, new extrema T(m, q) are stored in the first table memory. New values N(m, q), P(m, q), and U(m, q) are stored in the second through the fourth table memories.

In FIG. 2, a loop is exemplified for a start state p. The exemplified loop shows that a state transition for an n-th reference word n starts at the start state p and ends at an end state that is the start state p itself.

Turning to FIG. 3, the first line 16 is for the state p which serves as a start state. The second line 17 is for the state p serving as an end state. The predetermined and the preselected ranges have a common part 19. After calculation of Formulae (5) through (8), contents previously stored in the first through the fourth table memories at the start state p (along the first line 16) are undesirably changed partially along the common part 19 to different contents for the end state which is identical with the start state p. As will later be described, it is necessary on determining the result of recognition to refer to the contents of the first through the fourth table memories. The undesired change or destruction of the contents makes it impossible to get a correct result of recognition. Such destruction of the contents takes place also when the loop has different forms.

Before describing the preferred embodiments of this invention, the principles will be summarized on which a connected word recognition system according to this invention is operable. The recognition of an input pattern A is carried out by using first through N-th reference patterns $B^1$ to $B^N$ representative of first through N-th reference words 1 to N and an automation α. The input pattern A, the reference patterns B's, and the automation α are of the type described heretobefore. It is to be noted that several control signals are used. A first or basic timing signal successively specifies first through I-th periods of time for the first through the I-th input pattern feature vectors $a_1$ to $a_I$. A word specifying signal repeatedly specifies the first through the N-th reference words 1 to N. It will be assumed merely for convenience of description that the word specifying signal successively specifies the first through the N-th reference words 1 to N and consequently the first through the N-th reference patterns $B^1$ to $B^N$ during each period of time, such as an m-th period m, for which an m-th input pattern feature vector $a_m$ is assigned. Within a duration of time in which the word specifying signal specifies an n-th reference word n and therefore an n-th reference pattern $B^n$, a state specifying signal successively specifies state pairs (p, q)'s of that reference word n. Furthermore, a second or auxiliary timing signal successively specifies first through J-th moments, the first through the J-th moments are used to indicate the first through the J-th reference pattern feature vectors $b_1$ to $b_J$ for each reference word n irrespective of specification of the state pairs of the reference word n. Later, the first through the J-th moments are successively specified in each interval of time in which the state specifying signal specifies each state pair (p, q).

Operation of the connected word recognition system is featured by the fact that an ultimate recurrence value $g_p{}^n(m, q)$ for each reference word n, for a start state p thereof, and for each end state q related to the reference word n and the start state p by (p, q, n)∈Δ, is calculated in synchronism with specification of each period m by the use of a novel distance recurrence formula under a novel boundary condition:

$$g(m-1, 0) = T(m-1, p).$$

The recurrence formula may be:

$$g(m, j) = d(m, j) + \min \begin{bmatrix} g(m-1, j) \\ g(m-1, j-1) \\ g(m-1, j-2) \end{bmatrix}, \quad (9)$$

for which only the second natural number j is successively vraied from 1 up to J. Concurrently, the following substitution process is carried out under another bountary conditon:

$$h(m-1, 0) = m-1,$$

to provide an ultimate pointer $h_p{}^n(m, q)$ according to:

$$\begin{aligned} h(m, q) &= h(m-1, j), \\ h(m, q) &= h(m-1, j-1), \\ \text{and } h(m, q) &= h(m-1, j-2), \end{aligned} \quad (10)$$

if previous recurrence values $g(m-1, j)$, $g(m-1, j-1)$, and $g(m-1, j-2)$ minimize the second term on the right-hand side of Equation (9), respectively.

In order to provide the boundary condition for Formula (9), a previous extremum $T(m-1, p)$ is memorized in a first table memory of the type described hereinabove. Furthermore, previous recurrence values $g(m-1, j)$, $g(m-1, j-1)$, and $g(m-1, j-2)$ are memorized in preparation for calculation of Formula (9) in a first auxiliary table memory. The boundary condition and previous pointers $h(m-1, j)$, $h(m-1, j-1)$, and $h(m-1, j-2)$ for Formulae (10) are memorized in a second auxiliary table memory. In view of contents, the first and the second auxiliary table memories may be called recurrence value and pointer table memories, respectively.

It may appear at a first glance that Formulae (9) and (10) and the boundary conditions therefor are not much different from Formulae (5) and (6) and the boundary conditions therefor. The fact is, however, that there is a wide difference which makes a connected word recognition system according to this invention have astonishingly excellent performance as will become clear as the description proceeds. Indidentally, Formulae (9) and (10) will collectively be called a DP matching recurrence formula although Formula (9) alone is of the type which is usually named a DP matching formula.

During the m-th period m under consideration, Formulae (9) and (10) are repeatedly calculated for the respective reference words 1 through N and for all state pairs (p, q)'s which satisfy (p, q, n)∈Δ. In the meantime, the first table memory is referenced in order to decide a new extremum T(m, q) by an extremum calculating formula, which is identical with Formula (7). At the same time, new values N(m, q), P(m, q), and U(m, q) are decided according to Formulae (8) and stored in second through fourth table memories of the type mentioned heretobefore.

The above-described processes are carried out with the first timing signal made to consecutively specify the first through the I-th periods. In the I-th period, final extrema T(I, q)'s are obtained for those of the state transitions of the state transition table Δ for which the end states q's of the reference words are elements of the final state set F.

It is now possible to decide the result of recognition as described in U.S. Pat. No. 4,326,101 often referred to hereinabove. More particularly, an optimum final state q is selected at first from the final state set F by:

$$q = \arg \min[g_p{}^n(I, q)], q \in F \quad (11)$$

where the symbol "arg min" represents, as is will known in the art, selection of one of the parameters q's that minimizes the argument enclosed with the bracket pair on the right-hand side of Equation (11). Starting at a pair of initial conditions for the parameters m and q:

$$\left. \begin{aligned} m &= I \\ \text{and } q &= q, \end{aligned} \right\} \quad (12)$$

optimum reference words n's are successively decided by:

$$n = N(m, q), \quad (13)$$

by substituting an optimum start point u and an optimum start state p for the respective parameters m and q in Formula (13). The optimum parameters p and u are determined by:

$$\left. \begin{aligned} p &= P(m, q) \\ \text{and } u &= U(m, q), \end{aligned} \right\} \quad (14)$$

respectively, with the optimum start point u decided at first and then the optimum start state p. The decision of the optimum ones of the reference words, the start states, and the start points is iteratively carried out until the optimum start point u becomes the initial point 0 of the whole input pattern A.

Referring now to FIG. 4, a part of the i-j plane is depicted as an orthogonal coordinate plane together with a start state p and an end state q for an n-th reference word n. The m-th period in which Formula (9) is calculated, is indicated by a less tall rectangle. A next previous period, namely, the (m−1)-th period (m−1), is indicated by two rectangles vertically arranged to form a taller ractangle. A polygonal area consisting of the rectangles for the m-th and the (m−1)-th periods, will be called a processing window for the m-th period m.

When the second timing signal specifies the first reference pattern feature vector $b_1$, an elementary distance $d(m, 1)$ is used to calculate a new recurrence value $g(m, 1)$. Among three previous recurrence values $g(m-1, j)$, $g(m-1, j-1)$, and $g(m-1, j-2)$ used in Formula (9), the last one is not defined because (j−2) represents a negative integer. The last one is therefore understood to represent a sufficiently great value given by the greatest value wich the recurrence value table memory can memorize according to the design as is well known in the art. The middle one is equal to $g(m-1, 0)$, which is defined according to the boundary condition by the previous extremum $T(m-1, p)$ as indicated at a first dot nearest to the bottom of the figure in the rectangle for the (m−1)-th period. The first one is equal to $g(m-1, I)$ and indicated by a second dot next above the first dot.

When the second timing signal indicates the J-th reference pattern feature vector $b_J$, a new recurrence value $g(m, J)$ is calculated by using an elementary distance $d(m, J)$ and three previous recurrence values $g(m-1, J)$, $g(m-1, J-1)$, and $g(m-1, J-2)$ which are indicated by three dots near the top of the figure in the rectangle for the (m−1)-th period. For the n-th reference word n and the start state p which are under consideration, the last-mentioned recurrence value $g(m, J)$ gives the ultimate recurrence value $g_p{}^n(m, q)$ for the m-th period m under consideration and for each end state q related to the start state p of the n-th reference word n.

Figure 5:
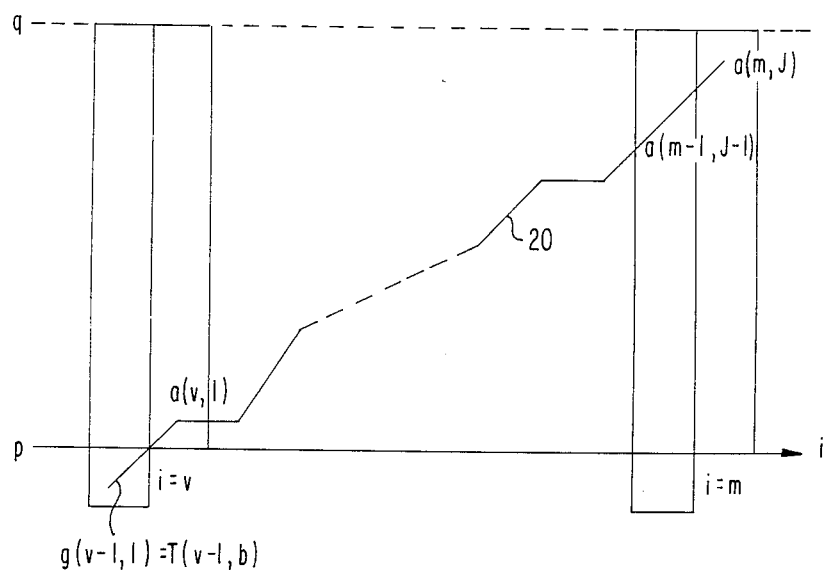
FIG. 5 is another schematic diagram for use in describing operation of the connected word recognition system.

Turning to FIG. 5, let the first timing signal successively specify a plurality of periods which end at the m-th period m, starting at one of previous periods that will be called a v-th period v. The processing window proceeds along the first time axis i in synchronism with successive specification of the periods from the v-th periods v to the m-th period m. Two processing windows are depicted for the v-th and the m-th periods v and m. Attention will be dericted to a particular reference word n and a particular state pair (p, q) thereof.

During the v-th periods v, an ultimate recurrence value $g(v, J)$ is eventually calculated. Among the elementary distances $d(v, j)$'s used in calculating the ultimate recurrence value $g(v, J)$, only $d(v, 1)$ is illustrated, together with one of the previous recurrence values that is defined by the boundary condition $T(v-1, p)$, by first and second dots as counted from the left end of the figure. When the end of the m-th period m is reached, the ultimate recurrence value $g(m, J)$ is eventually calculated by using an elementary distance (m, J) depicted by a dot nearest to the right end of the figure.

It is known in the art that the ultimate recurrence value $g(m, J)$ or $g_p{}^n(m, q)$ is equal to a summation of a plurality of elementary distances, such as $d(v, 1), \ldots,$ and $d(m, J)$, between those of the input pattern feature vectors $a_i$'s and those of the reference pattern feature vectors $b_j$'s which are along a certain polygonal line 20 specified by a warping or mapping function $f(i, j)=0$. It is also known that the input pattern feature vectors $a_i$'s so selected for the m-th period m, start at several previous periods, such as u's, given by Formula (2). If the reference word n and the start state p are the particular reference word n and the particular start state p, the particular pointer n represents a grid point $(u-1, 1)$, where u represents a particular start point or period for the fragmentary pattern $A(u, m)$ optimally matched to a reference pattern representative of the particular reference word n.

Figure 6:
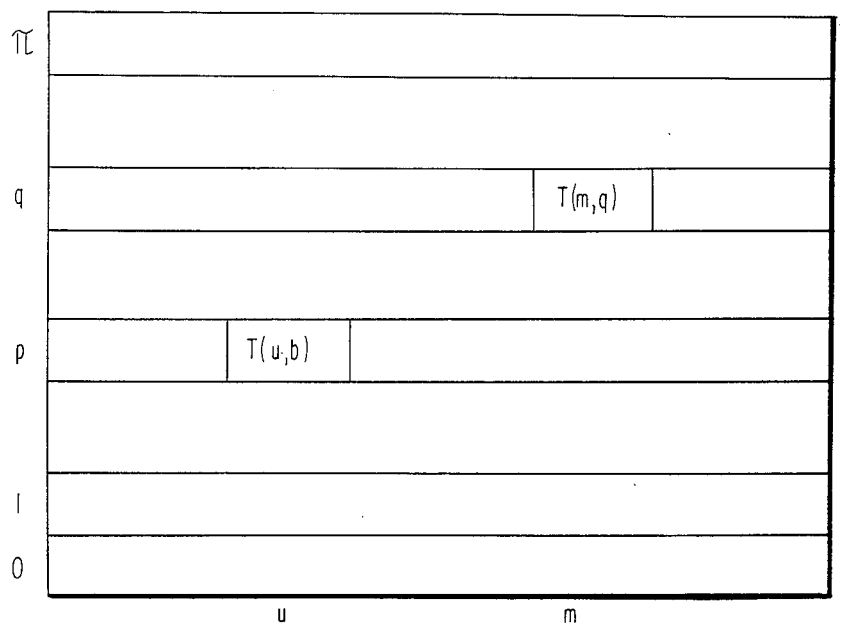
FIG. 6 is a block diagram of a table memory for use in the connected word recognition system.

Referring to FIG. 6, the first table memory has a plurality of addresses accessible two dimensionally by the first timing signal and a signal indicative of the end state q. The new extremum $T(m, q)$ is stored in an address accessed by the signals indicative of the m-th period m and the end state q. Inasmuch as the states p and q are identified by natural numbers as described before, the previous extremum $T(m-1, p)$ is read out of an address accessed by the first timing signal indicative of the (m−1)-th period (m−1) and a state signal indicative of the start state p. It is preferred for this purpose that the state specifying signal should consist of a start state signal and an end state signal individually indicative of a start state p and an end state q of each state pair (p, q) in the duration in which each reference word n is specified. Each of the second through the fourth table memories is similar in structure to the first table memory.

Figure 7:
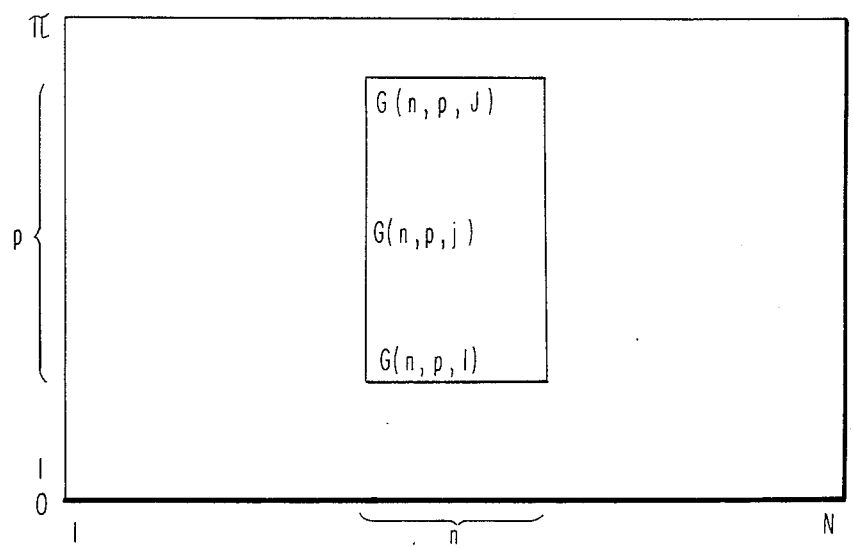
FIG. 7 is a block diagram of an auxiliary table memory for use in the connected word recognition system.

Turning to FIG. 7, the first auxiliary or recurrence value table memory has a plurality of addresses three dinensionally accessible by the word specifying signal, the start state signal, and the second timing signal. For this purpose, the memory may have a plurality of memory sectors accessible by the word specifying signal and the start state signal. Each memory sector has a plurality of addresses accessible by the secont timing signal to store the new recurrence values $g(m, 1)$ through $g(m, J)$ for the reference word n and the start state p being specified, as $G(n, p, 1)$ through $G(n, p, J)$. The second auxiliary or pointer table memory may be identical in structure to the recurrence value table memory. The contents thereof may be represented by $H(n, p, j)$.

As will later become clear, it is sufficient that the new recurrence value $g(m, j)$ be buffered during one period until rewritten during the next subsequent period (m+1). The addresses therefore need not be accessed by the first timing signal. The address need not be accessed by the signal indicative of the end states q's as will presently be described.

Figure 8B:
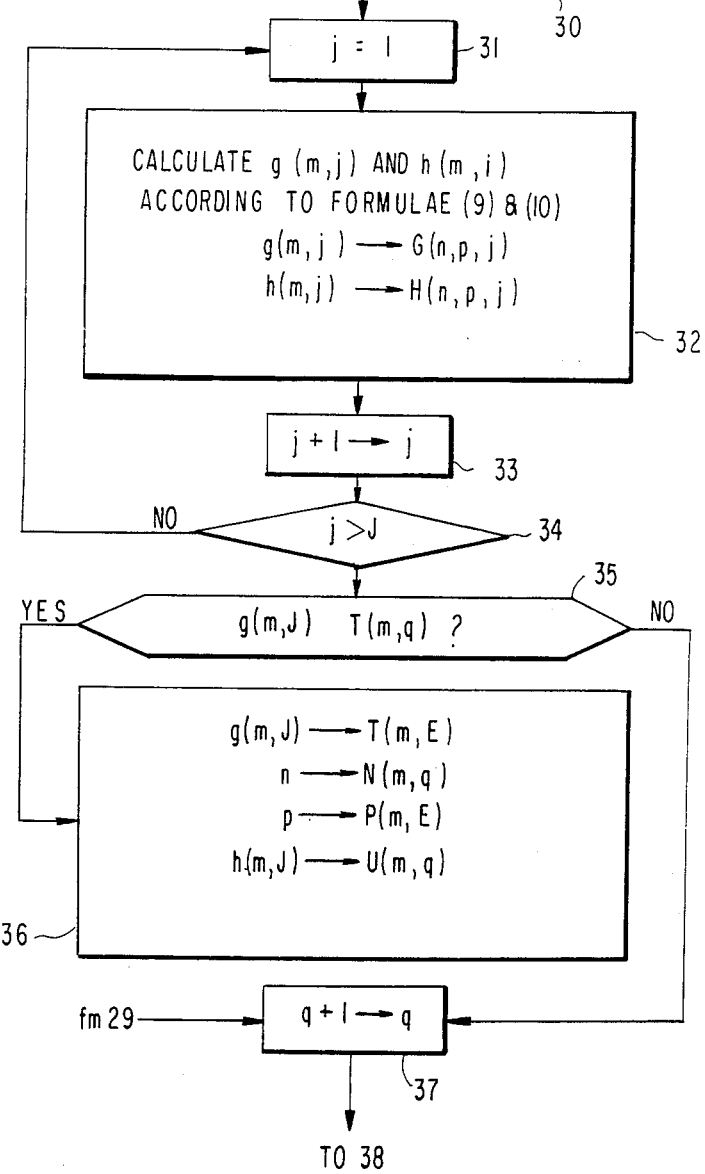
FIG. 8, drawn on four sheets as FIGS. 8 (a), (b), (c), and (d), is a flow chart illustrative of operation of a connected word recognition system according to a first embodiment of this invention.
Figure 8D:
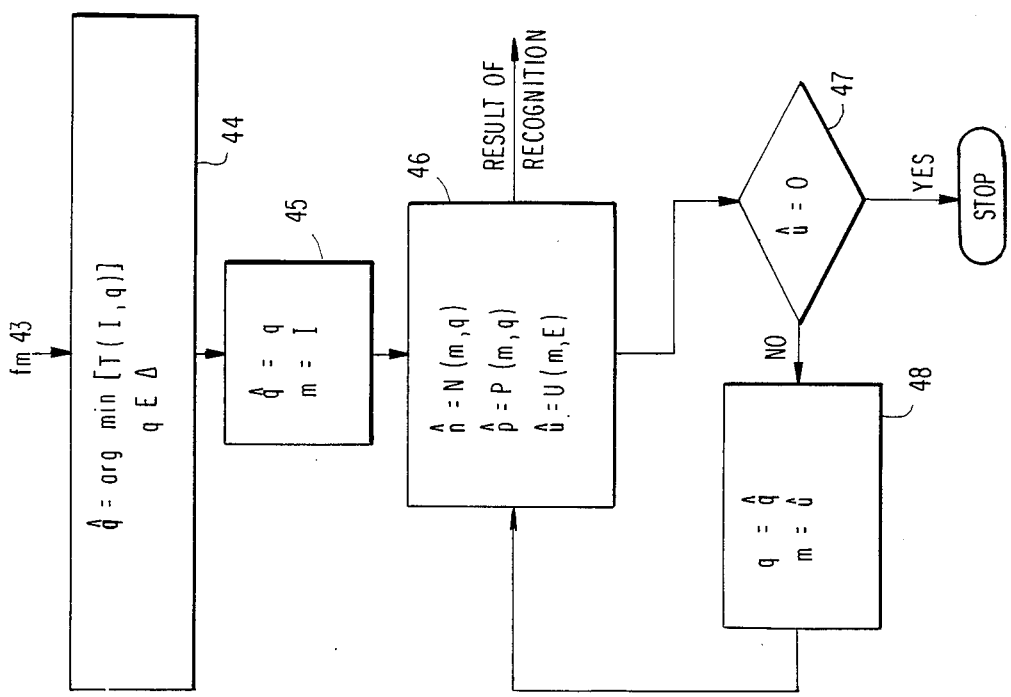
Figure 8C:
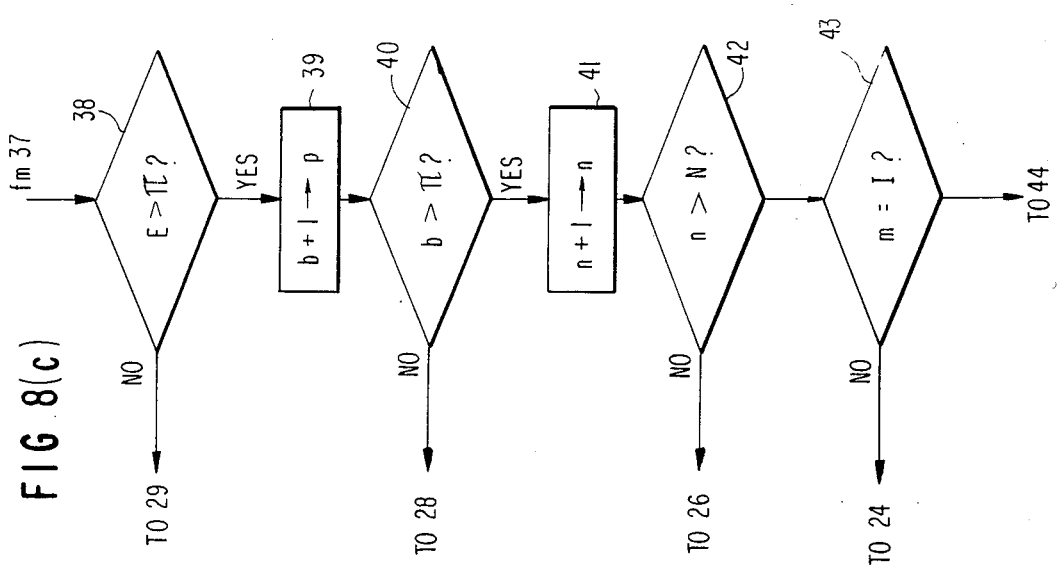

Referring now to FIG. 8, operation will be described more in detail as regards a connected word recognition system according to a second embodiment of this invention. At the start of operation, the first timing signal still indicates a zeroth period 0 as illustrated at a first stage 21. As depicted at a second stage 22, sufficiently great values are stored in the recurrence value memory as an initial condition at addresses accessible by the word specifying signal indicative of the first through the N-th reference words 1 to N, the start state signal indicative of the start states p's of the state set K together with the initial state $p_0$, and the second timing signal indicative of the first through the J-th moments. Furthermore, another initial condition is set in the first table memory as indicated at a third stage 23. More specifically, zero is stored in the address accessed by the first timing signal indicatve of the zeroth duration, by which it may be understood that the initial state $p_0$ is also indicated. Sufficiently great values are stored in the addresses accessible by the first timing signal indicative of the zeroth period and by the start state signal indicative of the start states p's except the initial state $p_0$ and in the addresses accessible by the first timing signal indicative of the first through the I-th periods and by the signal indicative of the initial state $p_0$. Furthermore, still another initial condition is set in the third stage 23 in the fourth table memory for storing the value $U(m, q)$. As the initial condition, zero is stored in the address accessed by the first timing signal indicative of the zeroth period. As described above, each sufficiently great value is the greatest value that can be memorized in the relevant address.

As shown at a fourth stage 24, the first timing signal is made to indicate the first period. It will be assumed that Formulae (5), (6), (9), and (10) are calculated as will shortly be described and that the first timing signal represents the m-th period m. The word specifying signal indicates the first reference word 1 as indicated at a fifth stage 25. As illustrated at a sixth stage 26, elementary distances (m, j)'s are calculated between the m-th input pattern feature vector $a_m$ and the reference pattern of the specified reference word 1 with the second timing signal made to indicate the first through the J-th reference pattern feature vectors $b_1$ to $b_J$ in the first through the J-th moments. The elementary distances are stored in a distance memory.

While the elementary distances d(m, j)'s are successively calculated, pairs of start and end states (p, q)'s are successively specified. As shown at seventh and eighth stages 27 and 28, the initial state $p_0$ is indicated at first as a pair (p, q). At a ninth stage 29, the pair (p, q) is checked whether or not the pair (p, q) is included for the specified reference word n in the state transition table (p, q, n)$\in \Delta$. Although the pair (0, 0) is not, it will be presumed that a pair (p, q) is specified, which is included in the state transition table $\Delta$.

As indicated at a tenth stage 30, previous recurrence values g(m−1, j)'s are prepared in the recurrence value table memory at the addresses accessed by the specified reference word n, the specified start state p, and the second timing signal indicative of the first through the j-the moments. Likewise, previous pointers h(m−1, j)'s are prepared in the pointer table memory. The previous extremum T(m−1, p) is prepared in the first table memory as the boundary condition for Formula (9). Moreover, the previous pointer h(m−1, 0) is prepared in the pointer table memory as the boundary condition for Formulae (10).

At an eleventh stage 31, the second timing signal is made to indicate the first moment j−1. As illustrated at a twelfth stage 32, Formulae (9) and (10) are calculated for the first moment. The new recurrence value g(m, 1) and the new pointer h(m, 1B calculated for the m-th period, the reference word 1, the state pair (p, q), and the first moment, are stored in the recurrence value and the pointer table memories. At a thirteenth stage 33, the second timing is varied to indicate a next following moment (j+1). At a fourteenth stage 34, the second timing signal is checked if it indacates or not the J-th moment J. If not, the stages 32, 33, and 34 are repeated. When the second timing signal eventually indicates the J-th moment J, an ultimate recurrence value g(m, J) and an ultimate pointer h(m, J) are obtained. It is to be noted that the processes are carried out at the stages 30 and 32 independently of the end state q although dependently on the reference word n and the start state p and that the recurrence value and the pointer table memories need not be accessible by the end state signal.

At a fifteenth stage 35, Formula (7) is calculated by checking whether or not the ultimate recurrence value g(m, J) is less than an extremum T(m, q) previously calculated and memorized in the first table memory at an address accessed by the first timing signal indicative of the m-th period m and the end state signal indicative of the end state q. If affirmative, the ultimate recurrence value g(m, J) or $g_p{}^n$(m, q) is substituted for the greater extremum T(m, q) in a sixteenth stage 36. Moreover, Formulae (8) are calculated. If not, the end state signal is made to indicate a different end state as indicated at a seventeenth stage 37. The process of the stage 37 is carried out also when the state pair (p, q) is not found for the reference word n in the state transition table $\Delta$ at the ninth stage 29.

At an eighteenth stage 38, the new end state is checked whether or not the natural number assigned thereto is greater than the maximum number $\pi$ assigned to the states of the state set K. If not, the ninth stage 39 and the following stages are repeated once more. If yes, the start point signal is made to specifiy a greater numbered start state at a ninteenth stage 39. At a twelfth stage 40, a test similar to that in the eighteenth stage 38 is carried out for the new start state. If the number representative of the new start state is less than the greatest number $\pi$, the eighth stage 28 and the following stages are repeated once again. If the number becomes greater than the maximum number $\pi$, the word specifying signal is made to specify a next reference word at a twenty-first stage 41. The next reference word is checked at a twenty-second stage 42 if or not the number assigned thereto is greater than the greatest number N for the reference words. If not, the sixth stage 26 and the following stages are repeated again. If the number becomes greater than the greatest number N, the first timing signal is checked at a twenty-third stage 43 if or not the period thereby specified is the I-th period I. If not the fourth stage 24 and the following stages are repated again until the first timing signal is found to indicate the I-th period I at the thirty-third stage 43.

When the first timing signal is found at the twenty-third stage 43 to indicate the I-th period I, the result of recognition is decided according to Formulae (11) through (14). More particularly, Formula (11) is processed at a twenty-fourth stage 44. Initial conditions of Formulae (12) are set at a twenty-fifth stage 45. Formulae (13) and (14) are processed at a twenty-sixth stage 46 at first for the initial conditions. At a twenty-seventh stage 47, a test is carried out to decide whether or not the optimum start point or period u is the initial point 0. If not, the optimum end state q and the optimum start point u are substituted at a twenty-eighth stage 48 for the parameters q and m in each of Formulae (13) and (14). The stages 46 through 48 are repeatedly processed until the optimum start point u eventually becomes the initial state 0, when the operation comes to an end.

Figure 9:
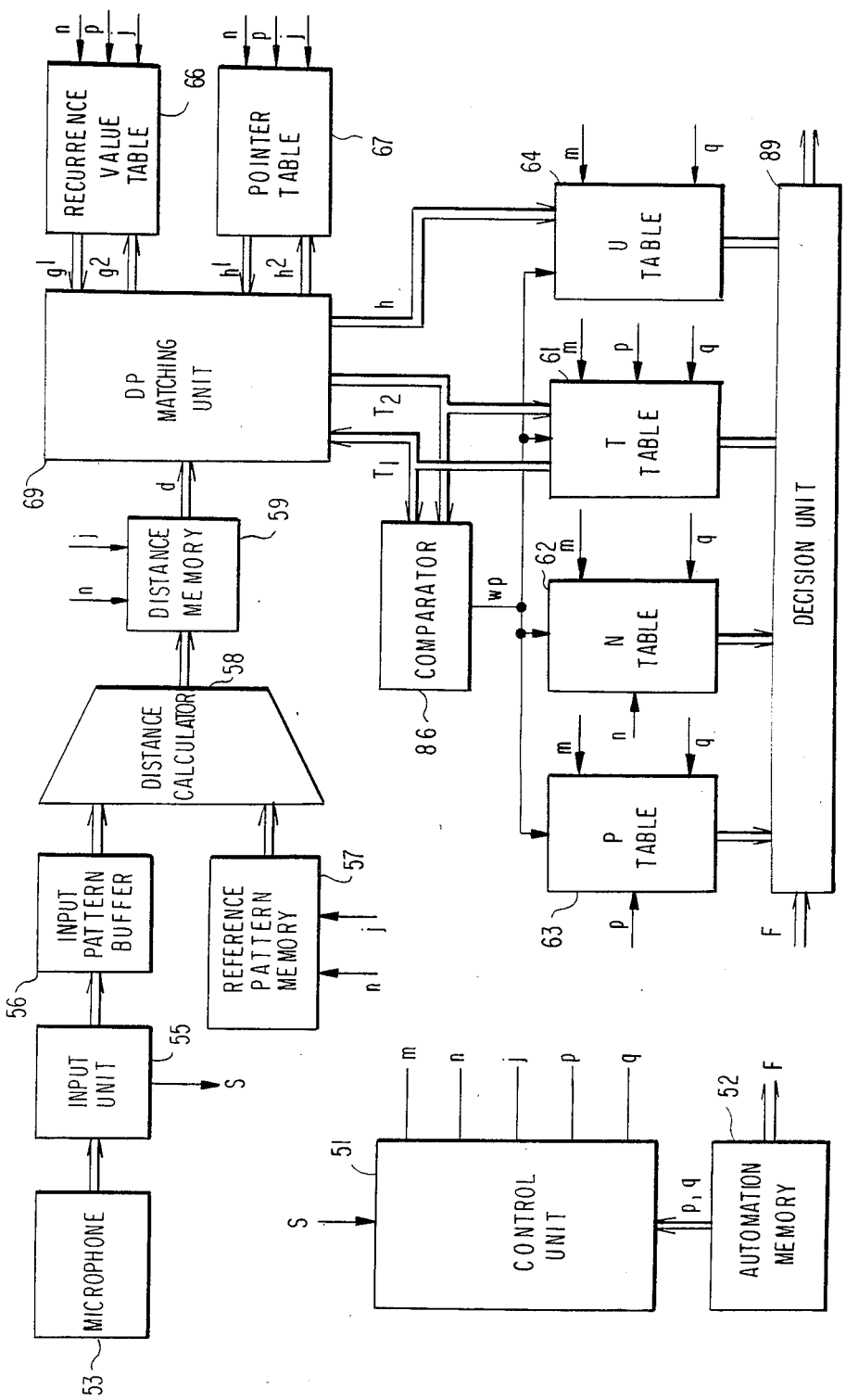
FIG. 9 is a block diagram of a connected word recognition system according to a second embodiment of this invention.
Figure 10:
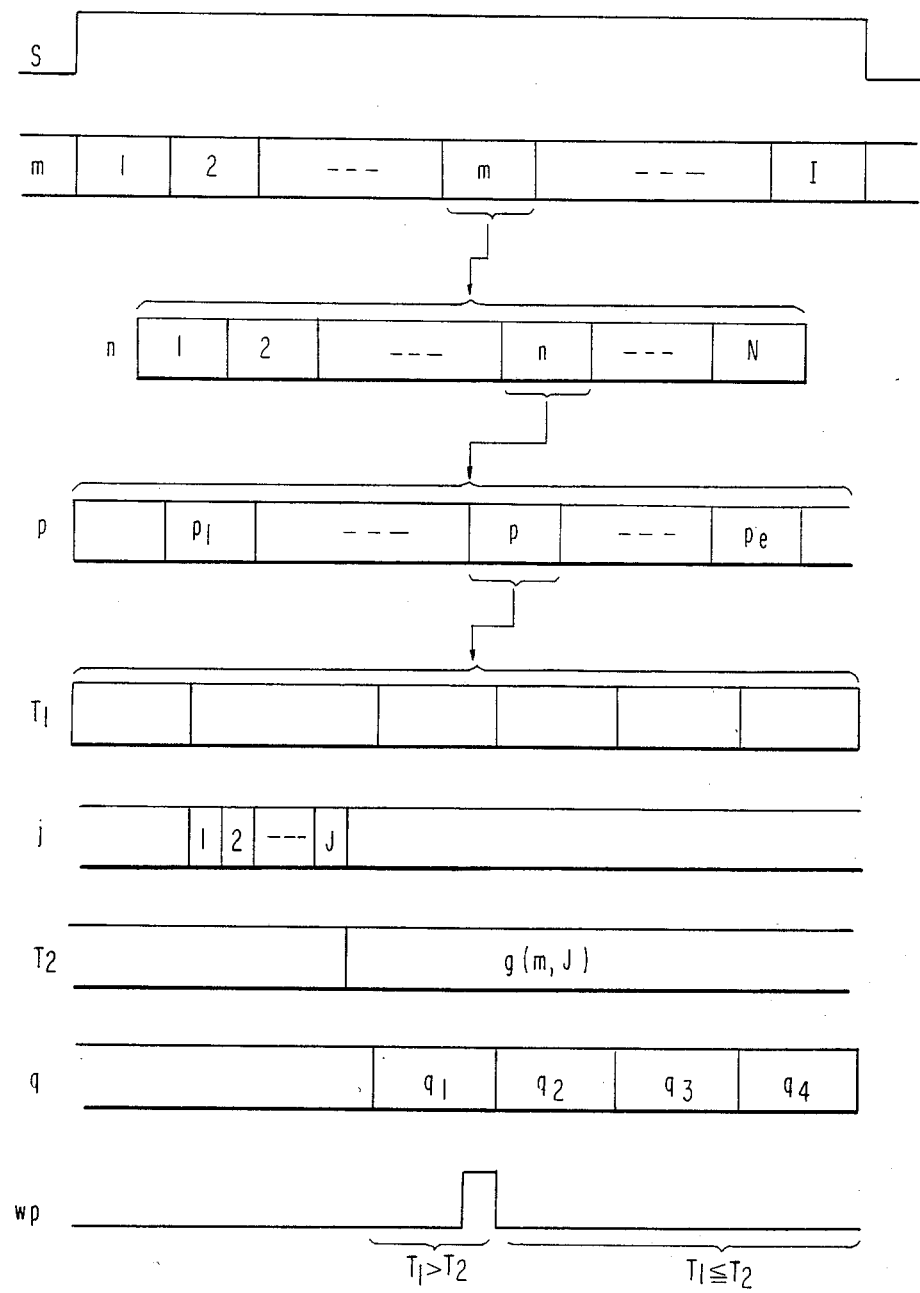
FIG. 10 is a time chart for use in describing operation of the connected word recognition system depicted in FIG. 9.

Referring now to FIGS. 9 and 10, a connected word recognition system according to a second embodiment of this invention comprises a control unit 51 for generating various control signals which are used in controlling other parts of the system as will be described in the following. An automaton memory 52 is for memorizing the state transition table $\Delta$ and the final state set F of the type described heretobefore.

When an input string of substantially continuously uttered words is supplied to a microphone 53, an input unit 55 detects the sound energy of the utterance to supply the control unit 51 with a speech interval signal S representative of a speech interval. It will be assumed that the speech interval signal S builds up to a binary one level at the beginning of the speech interval and down to a binary zero level at the end thereof.

Responsive to build up of the speech interval signal S, the control unit 51 generates an initializing pulse (not shown) and begins to generate a first or basic timing signal m which is counted up to successively specify first through I-th periods of time or frames during the interval. It will be assumed that the speech interval is I frames long. In other words, an input pattern A defined by the sound waveform of the input string, has an input pattern length or duration I. The initializing pulse is produced before the first timing signal m is counted up as described with reference to FIG. 8 in connection with the first stage 21. The initializing pulse carries out the processes described at the second and the third stages 22 and 23.

The input unit 55 subjects the input pattern A to frequency analysis and frame sampling to convert the same to a time sequence of first through I-th input pattern feature vectors $a_1$ to $a_I$ or $a_i$'s in synchronism with the first siming signal m. An input unit of the type described, is detailed in U.S. Pat. No. 4,049,913 issued to Hiroaki Sakoe, the present applicant and assigned to the present assignee.

The input pattern feature vectors $a_i$'s are successively delivered to an input pattern buffer 56, which holds an m-th input pattern feature vector $a_m$ during an m-th period m. It should be noted that the same reference symbols, as m, will sometimes be used merely for simplicity of denotation in designating different and yet closely related matters, such as a signal and a value thereby represented.

A reference pattern memory 57 is for memorizing first through N-th reference patterns $B^1$ to $B^N$ or $B^n$'s representative of first through N-th reference words 1 to N or n's of the word set $\Sigma$ described before. Each reference pattern $B^n$ is stored in the reference pattern memory 56 as first through J-th reference pattern feature vectors $b_1^n$ to $b_J^n$ or $b_j^n$'s. As noted above, the affix n will be omitted depending on the circumstances.

The control unit 51 generates a word specifying signal n which successively specifies the respective reference words n's of the word set $\Sigma$ in a predetermined order, such as from 1 to N, during each of the first through the I-th periods 1 to I. In a duration of time in which the word specifying signal n specifies each of the first through the N-th reference words 1 to N, the automaton memory 52 produces a start state signal p indicative of the start states p's for the specified reference word according to the state transition table $\Delta$. Moreover, the automaton memory 52 produces an end state signal q indicative of the end states q's related to the reference word and the start states p's thereof in accordance with the state transition table $\Delta$. In FIG. 9, the start and the end state signals p and q are depicted as if produced by the control unit 51.

Figure 11:
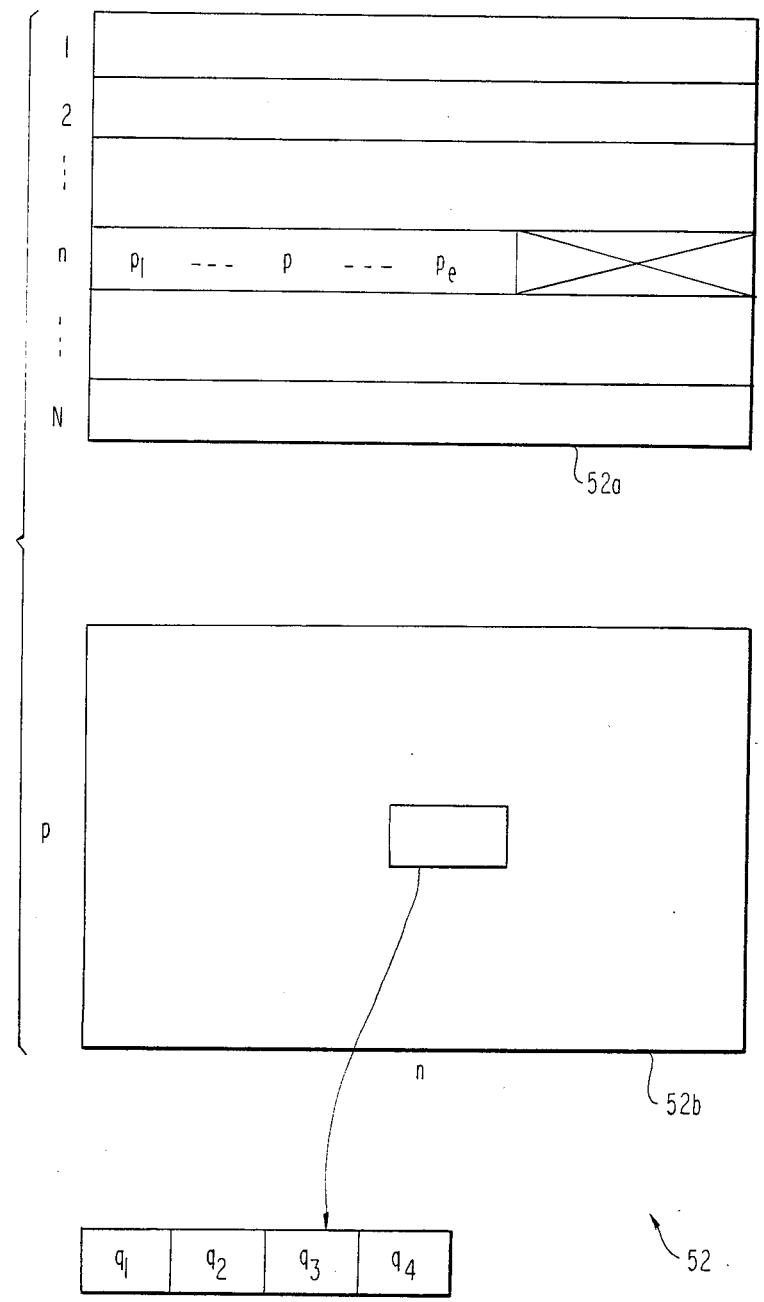
FIG. 11 is a block diagram of an automaton memory for use in the connected word recognition system shown in FIG. 9.

Turning to FIG. 11 for a short while, the automaton memory 52 may comprise first and second sections 52a and 52b. The first section 52a comprises first through N-th memory sectors assigned to the first through the N-th reference words 1 to N, respectively, and accessible by the word specifying signal n. In each memory sector, at least one start state p of the reference word assigned thereto is memorized. By way of example, the n-th memory sector memorises a plurality of start states $p_1, \ldots, p, \ldots,$ and $p_e$ of the n-th reference word n. During each duration in which the n-th reference word n is specified, the start state signal p successively indicates the start states $p_1$ through $p_e$.

The second section 52b comprises first through N-th memory blocks allotted to the first through the N-th reference words 1 to N, respectively, and accessible by the word specifying signal n. Each memory block comprises a plurality of memory areas which are assigned to the start states p's of the reference word allotted to that memory block and are accessible by the start point signal p representative of the start states p's. Each memory area is for memorizing at least one end state q of the reference word and for such start states p's. For example, end states $q_1$, $q_2$, $q_3$, and $q_4$ are memorized in a memory area for the n-th reference word n and the start state p thereof. Within each interval of time in which each start state, such as p is indicated, the end state signal q successively indicates the end states $q_1$ through $q_4$.

Referring back to FIGS. 9 and 10, the control unit 51 generates a second or auxiliary timing signal j. At first before production of the start state signal p indicative of the start state $p_1$, the second timing signal j specifies first through J-th moments in the duration in which each reference word n is specified.

The word specifying signal n is delivered to, among others, the reference pattern memory 57 to specify one of the reference patterns B's in each duration. Responsive to the second timing signal j indicative of the first through the J-th moments, the reference pattern memory 57 produces the first through the J-th reference pattern feature vectors $b_j$'s of the reference pattern B being specified, respectively.

A distance calculator 58 calculates elementary distances d(m, j)'s between the m-th input pattern feature vector $a_m$ and the respective reference pattern feature vectors $b_j$'s of the specified reference pattern B as illustrated at the sixth stage 26 in FIG. 8. The elementary distances d(m, j)'s thus calculated for the respective reference words 1 to N, are stored in a distance memory 59 which is two dimensionally accessible by the word specifying signal n and the second timing signal j. The distance calculator and memory 58 and 59 serve as distance or similarity measure calculating circuitry.

The connected word recognition system being illustrated, comprises first through fourth table memories or working registers 61, 62, 63, and 64 and first and second auxiliary table memories or recurrence value and pointer table memories 66 and 67. The memories 61 through 64, 66, and 67 are of the structure illustrated with reference to FIGS. 6 and 7. The first table memory 61 is for the extrema T(m, q)'s. The second through the fourth table memories 62 to 64 are for the values N(m, q)'s, P(m, q)'s, and U(m, q)'s. The recurrence value table memory 66 is for the distance recurrence values g(m, j)'s for the respective reference words n's and for the respective start states p's. Contents of the memory 61 will therefore be denoted by G(n, p, j). The pointer table memory 67 is for the pointers h(m, j)'s, which will likewise be denoted by H(n, p, j).

Prior to the m-th period m, the initializing pulse sets the initial conditions in the recurrence value table memory 66, the first table memory 61, and the fourth table memory 64 as described in conjunction with the second and the third stages 22 and 23 illustrated in FIG. 8. Operation of the m-th period m will be continued.

The start state signal p is produced to specify the start states p's of the reference word being specified. Let the start states $p_1, \ldots, p, \ldots,$ and $p_e$. One cycle of operation in an interval of time will be described for one of the start states p's, such as p. The second timing signal j is made to successively specify first through J-th moments 1 to J like prior to production of the start state signal p. It should be noted that the following description is somewhat different from that illustrated with reference to FIG. 8. The following operation is, however, equivalent in principle and has a higher efficiency as will presently be pointed out.

Figure 12:
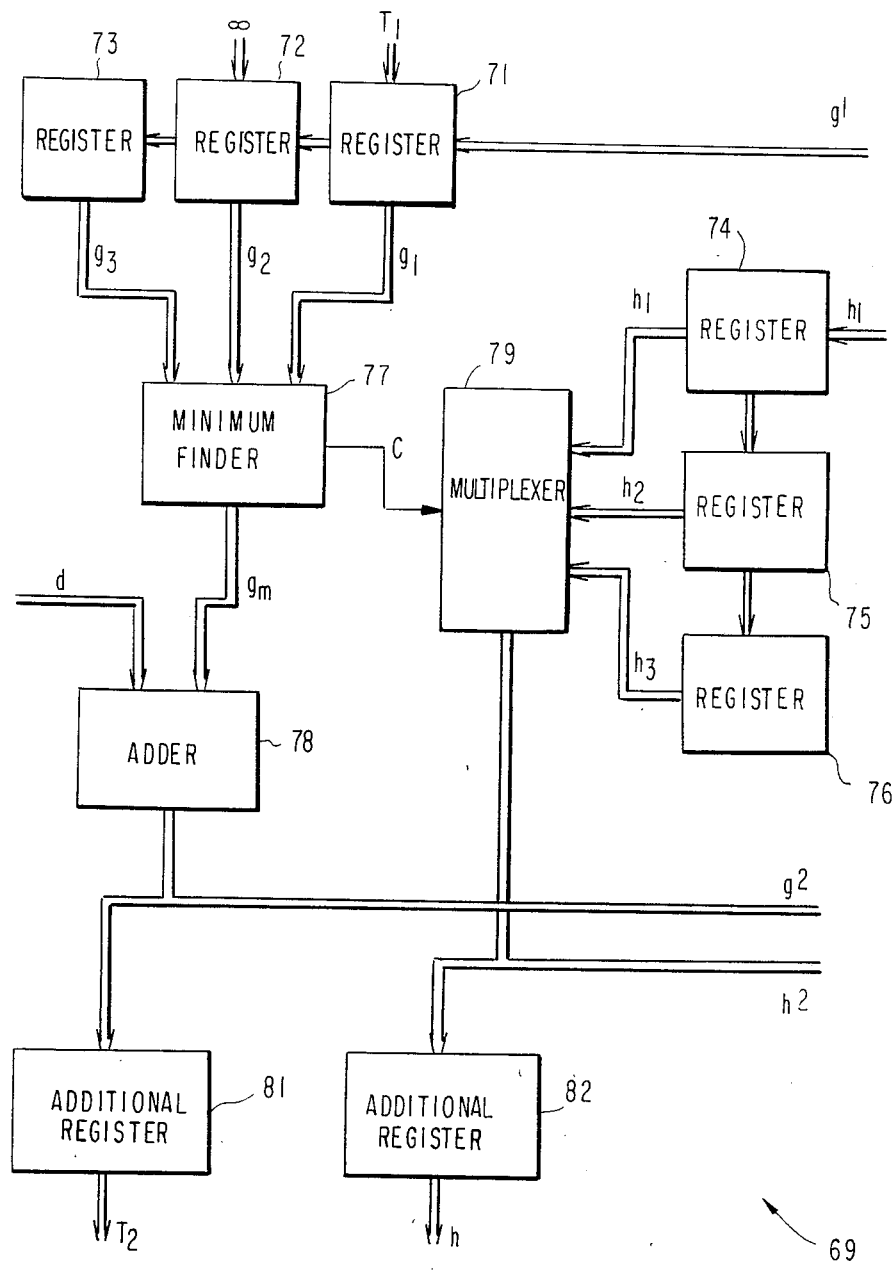
FIG. 12 is a block diagram of a DP matching unit for use in the connected word recognition system shown in FIG. 9.

Referring additionally to FIG. 12, a DP matching unit 69 comprises first through third registers 71, 72, and 73 and fourth through sixth resisters 74, 75, and 76. Before the second timing signal j specifies the first moment 1, the previous extremum $T(m-1, p)$ is supplied from the first table memory 61 to the first register 71 through a signal line $T_1$. A sufficiently great value is set in the second register 72. The boundary condition $h(m-1, 0)$ for Formula (10) is delivered from the pointer table memory 67 to the fourth register 74 through a signal line $h^1$. Formulae (9) and (10) are calculated as follows with the second timing signal j varied to consecutively indicate the first through the J-th moments.

When the second timing signal j indicates the j-th moment j, a previous recurrence value $g(m-1, j)$ or $G(n, p, j)$ is supplied from the recurrence value table memory 66 to the first register 71 through a signal line $g^1$. A previous pointer $h(m1, j)$ or $H(n, p, j)$ is delivered from the pointer table memory 67 to the fourth register 74 through the signal line $h^1$. Contents previously held in the first and the fourth registers 71 and 74 at the $(j-1)$-th moment, are $G(n, p, j-1)$ and $H(n, p, j-1)$. Such contents are moved to the second and the fifth registers 72 and 75, respectively. Contents held in the second and the fifth registers 72 and 75 in the $(j-1)$-th moment, are $G(n, p, j-2)$ and $H(n, p, j-2)$. The contents are moved to the third and the sixth registers 73 and 76. The contents held in the first through the sixth registers 71 to 76 in each moment will be denoted by $g_1$, $g_2$, and $g_3$, and $h_1$, $h_2$, and $h_3$, respectively. On the other hand, an elementary distance $d(m, j)$ for the reference pattern representative of the reference word being specified, is supplied from the distance memory 59 to the DP matching unit 69 through a signal line d.

A minimum finder 77 finds a minimum $g_m$ of the contents $g_1$ through $g_3$ and produces the minimum. At the same time, the minimum finder 77 produces a switch signal C which takes one of three values $c_1$, $c_2$, and $c_3$ when the minimum $g_m$ is the contents $g_1$ through $g_3$, respectively. An adder 79 calculates a sum of the minimum $g_m$ and the elementary distance $(m, j)$ and produces a new recurrence value $g(m, j)$, which is stored in the recurrence value table memory 66 through a signal line $g^2$. Responsive to the switch signal C, a multiplexer 79 selects one of the contents $h_1$ through $h_3$ as a new pointer $h(m, j)$ in accordance with one of the three values $c_1$ to $c_3$. The new pointer $h(m, j)$ is stored in the pointer table memory 67 through a signal line $h^2$.

The DP matching unit 69 comprises first and second additional regesters 81 and 82. At the end of the J-th moment, the minimum $g_m$ gives the ultimate recurrence value $g(m, j)$ or $g_p{}^n(m, q)$. The multiplexer 79 produces the ultimate pointer $h(m, J)$ or $h^{pn}(m, q)$. The ultimate recurrence value and pointer $g(m, J)$ and $h(m, J)$ are stored also in the additional registers 81 and 82 and are delivered therefrom towards the first and the fourth table memories 61 and 64 through signal lines $T_2$ and h. The ultimate recurrence value $g(m, J)$ is supplied furthermore to a comparator 86 through a branch of the signal line $T_2$. Operation of the DP matching unit 69 is suspended.

As described before, the end state signal q successively specifies the end states q's for the reference word n and the start state p which are specified for the time being. Operation proceeds to the fifteenth and the sixteenth stages 35 and 36 described heretobefore in conjunction with FIG. 8. An insant will be brought into consideration at which the end state signal q specifies the end state $q_1$.

The first table memory 61 supplies the extremum $T(m, q)$ to the comparator 86 through a branch of the signal line $T_1$ for comparison with the ultimate recurrence value $g(m, J)$. Only when the utlimate recurrence value $g(m, J)$ is less than the read out extremum $T(m, q)$, the comparator 86 supplies a write-in pulse wp to the first through the fourth table memories 61 to 64 as best depicted in FIG. 10. The ultimate recurrence value $g(m, J)$ is substituted for the read out extremum $T(m, q)$ in the first table memory 61. The word specifying signal n delivered towards the second table memory 62 is stored therein as $N(m, q)$. The start state signal p supplied towards the third table memory 63 is stored therein as $P(m, q)$. The ultimate pointer $h(m, J)$ supplied towards the fourth table memory 64 through the signal line h is written therein as $U(m, q)$.

When all end states, such as $q_1$ through $q_4$, are specified, operation in the interval for the start state p comes to an end. When all start states, such as $p_1$ through $p_e$, are indicated, operation in the duration for the reference word being specified, comes to an end. When all reference words 1 to N are specified, operation for the m-th period m comes to an end.

It would have been understood that the operation being described is different from that illustrated with reference to FIG. 8 as regards the operation for the end states q's. As pointed out hereinabove, the processes carried out at the tenth and the twelfth stages 30 and 32 are independent of the end states q's. Therefore, operation of the DP matching unit 69 and the recurrence value and the pointer table memories 66 and 67 need not be repeated for each of the end states q's. This reduces the amount of calculation by a factor of the number of the end states, such as $q_1$ through $q_4$, to unity. Even with this, the comparator 86 selects the new extremum $T(m, q)$ at the fifteenth and the sixteenth stages 35 and 36 for all the transition rules (p, q, n)'s allowed to the reference words 1 to N and all the start states, such as $p_1$ through $p_e$ and the like, of the reference words 1 to N. Operation of the connected word recognition system being illustrated, is therefore equivalent in principle to that illustrated with reference to FIG. 8. Furthermore, it would have been understood that the extremum $T(m, q)$ is decited by an extremum finding circuit comprising the first through the third table memories 61 to 63, the first auxiliary or recurrence value table memory 66, the comparator 86, and those parts of the DP matching unit 69 which comprise the first through the third registers 71 to 73, the minimum finder 77, the adder 78, and the first additional register 81. A particular start point or period is selected from the first through the $(m-1)$-th periods by a start period selecting circuit comprising the fourth table memory 64, the second auxiliary or pointer table memory 67, and those parts of the DP matching unit 69 which comprise the fourth through the sixth registers 64 to 66, the multiplexer 79, and the second additional register 82.

The above-described operation is repeated during each of the first through the I-th periods. At the end of the I-th period, the speech interval signal S is reset to the binary zero level. The automaton memory 52 supplies a decision unit 89 with a final state signal F successively indicative of the final states of the set F.

The decision unit 89 is connected to the first through the fourth table memories 61 to 64 so as to carry out the decision process by prosucuting Formulae (11) through (14) as described with reference to FIG. 8 at the twenty-fourth through the twenty-eighth stages 44 to 48. The decision unit 89 produces a signal n representative of the optimum concatenation of optimum reference words n's. As described in U.S. Pat. No. 4,326,101, it is possible to implement the decision unit 89 by a microprocessor. The decision unit 89 will therefore not be described in detail.

While this invention has thus far been described with reference to FIGS. 4 through 12, it will now be possible for one skilled in the art to put this invention into effect in various other manners. For example, the distance recurrence formula may be that of a higher performance, such as:

$$g(m, j) = \min \begin{bmatrix} g(m-2, j-1) + d(m-1, j) + d(m, j) \\ g(m-1, j-1) + d(m, j) \\ g(m-1, j-2) + d(m, j) \end{bmatrix},$$

in which case it is necessary to keep the previous recurrence values $g(m-2, j-1)$ during two periods. The first auxiliary or recurrence value table memory 66 should accordingly be varied. Moreover, the distance memory 59 should be accessible, during the m-th period, by the first timing signal m which additionally specifies the $(m-1)$-th periods. The DP matching unit 69 should furthermore be modified.

Any of other similarity measures, such as correlation, may be used rather than the distance. In this event, it is necessary to resort to a maximization process instead of the minimization operation.

What is claimed is:

1. A system responsive to an input sequence of input pattern feature vectors representative of an input string of words selected from a word set of first through N-th words and substantially continuously uttered in compliance with a regular grammar for recognizing said input string as an optimum one of word concatenations, each concatenation being a string of words selected from said word set and cancatenated in compliance with said grammar, said grammar specifying a set of transition rules for said first through said N-th words and a set of final states of said concatenations, the transition rule for an n-th word optionally selected from said word set defining a combination of said n-th word and a state pair consisting of a start and an end state of said n-th word, said system comprising:

a reference pattern memory for memorizing reference pattern feature vectors representative of said first through said N-th words, the reference pattern feature vectors representative of said n-th word being consecutively numbered as first through J-th feature vectors according to utterance of said n-th word;

control means for generating a basic timing signal successively specifying first through I-th periods assigned to the respective input pattern feature vectors, a word specifying signal specifying, while an m-th period is specified as each of said first through said I-th periods, said first through said N-th words, and a state specifying signal specifying, while said m-th period is specified, the state pairs of said first through said N-th words;

similarity calculating means responsive to said input sequence and coupled to said reference pattern memory and said control means for calculating, while said n-th word is specified in said m-th period, a plurality of similarity measures between the input pattern feature vector assigned to said m-th period and said first through said J-th feature vectors;

extremum finding means coupled to said control means and said similarity calculating means for calculating, while said n-th word and each state pair of said n-th word are specified in said m-th period, a recurrence value $g_p{}^n(m, q)$ for said n-th word and said each state pair under a boundary condition iteratively in correspondence to said first through said J-th feature vectors by using the similarity measures calculated for said n-th word before said m-th period, where m represents said m-th period, n represents said n-th word, and p and q represents the start and the end states of said each state pair, for finding, while said m-th period is specified, an extremum $T(m, q)$ of the recurrence values calculated for the words having state pairs including said end state q, and for deciding that particular word and that particular start state of said particular word for which said extremum is found, said boundary condition being given by $T(m-1, p)$;

start period selecting means coupled to said control means and said extremum finding means for selecting, while said m-th period is specified, a particular period from said first through the $(m-1)$-th periods with reference to said particular start state and said particular word; and deciding means coupled to said control means, said extremum finding means, and said start period selecting means for deciding the optimum concatenation by referring, after lapse of said I-th period, to the extrema found in said first through said I-th periods, respectively, and to those particular words, those particular start states, and those particular start periods which are decided in said first through said I-th periods.

* * * * *

UNITED STATES PATENT AND TRADEMARK OFFICE
CERTIFICATE OF CORRECTION

PATENT NO. : 4,555,796
DATED : November 26, 1985
INVENTOR(S) : Hiroaki SAKOE

It is certified that error appears in the above-identified patent and that said Letters Patent is hereby corrected as shown below:

Column 2, Line 17, "1 up to  ." should read --1 up to $\overline{n}$.--

Line 19, "{p|p = 1, 2,..., }" should read

--{p|p = 1, 2,..., $\overline{n}$} --;

Line 32, "1 through  ." should read -- 1 through $\overline{n}$.--

Column 3, Line 10, " ||$a_{i-bj}$||" should read -- ||$a_i - b_j$||--

Column 10, Line 25, "q" should read --$\hat{q}$--

Line 27, "q = arg...." should read --$\hat{q}$ = arg....--

Formula 12, "m = I and q = q }" should read --m = $I_{\hat{q}}$ and q = $\hat{q}$}--

Line 40, "words n's" should read --words $\hat{n}$'s--

Line 45, "start point u" should read --start point $\hat{u}$--

UNITED STATES PATENT AND TRADEMARK OFFICE
CERTIFICATE OF CORRECTION

PATENT NO. : 4,555,796
DATED : November 26, 1985
INVENTOR(S) : Hiroaki SAKOE

It is certified that error appears in the above-identified patent and that said Letters Patent is hereby corrected as shown below:

Line 46, "start state p" should read --start state $\hat{p}$--;

Line 47, "p and u" should read --$\hat{p}$ and $\hat{u}$--

Line 51-52, "p = P(m,q) should read --$\hat{p}$ = P(m,q)
and u = U(m,q)" and $\hat{u}$ = U(m,q)

Line 54, "start point u" should read --start point $\hat{u}$--

Line 55, "start state p" should read --start state $\hat{p}$--

Line 58, "start point u" should read --start point $\hat{u}$--

Column 11, Line 65, "n and the particular start state p" should read --$\tilde{n}$ and the particular start state $\tilde{p}$--

Line 66, "pointer n" should read --pointer $\tilde{n}$--

Line 66, "(u-1, 1)" should read --($\tilde{u}$-1, 1)--

UNITED STATES PATENT AND TRADEMARK OFFICE
CERTIFICATE OF CORRECTION

PATENT NO. : 4,555,796
DATED : November 26, 1985
INVENTOR(S) : Hiroaki SAKOE

It is certified that error appears in the above-identified patent and that said Letters Patent is hereby corrected as shown below:

Line 67, "where u" should read --where $\tilde{u}$--;

Line 68, "A(u,m)" should read --A($\tilde{u}$,m)--

Column 12, Line 2, "word n" should read --word $\tilde{n}$--

Column 13, Line 13, "(m,j)'s" should read --d(m,j)'s--

Column 14, Line 43, "period u" should read --period $\hat{u}$--

Line 44, "state q" should read --state of $\hat{q}$--

Line 45, "point u" should read --point $\hat{u}$--

Line 48, "point u" should read --point $\hat{u}$--

Column 17, Line 45, "(m,j)" should read --d(m,j)--

Line 57, "$h^{pn}(m,q)$" should read --$h_p^n(m,q)$--

UNITED STATES PATENT AND TRADEMARK OFFICE
CERTIFICATE OF CORRECTION

PATENT NO. : 4,555,796
DATED : November 26, 1985
INVENTOR(S) : Hiroaki SAKOE

It is certified that error appears in the above-identified patent and that said Letters Patent is hereby corrected as shown below:

Column 18, Line 3, " insant" should read --instant--

Column 19, Line 6, "signal n" should read --signal $\hat{n}$--

Line 8, "words n's" should read --words $\hat{n}$'s--

Signed and Sealed this

Twelfth Day of August 1986

[SEAL]

Attest:

DONALD J. QUIGG

Attesting Officer

Commissioner of Patents and Trademarks